US011949060B2

(12) United States Patent
Sabrowsky et al.

(10) Patent No.: US 11,949,060 B2
(45) Date of Patent: Apr. 2, 2024

(54) RECHARGEABLE HEARING AID BATTERY WITH SLOTTED GROMMET

(71) Applicant: ENERGIZER BRANDS, LLC, St. Louis, MO (US)

(72) Inventors: Benjamin Sabrowsky, St. Louis, MO (US); Marc Syvertsen, St. Louis, MO (US); Casey Imhoff, St. Louis, MO (US); Danielle Proffit, St. Louis, MO (US); Jacob Karsseboom, St. Louis, MO (US)

(73) Assignee: ENERGIZER BRANDS, LLC, St. Louis, MO (US)

( * ) Notice: Subject to any disclaimer, the term of this patent is extended or adjusted under 35 U.S.C. 154(b) by 48 days.

(21) Appl. No.: 16/567,478

(22) Filed: Sep. 11, 2019

(65) Prior Publication Data

US 2020/0083497 A1 Mar. 12, 2020

Related U.S. Application Data

(60) Provisional application No. 62/733,599, filed on Sep. 19, 2018, provisional application No. 62/729,933, filed on Sep. 11, 2018.

(51) Int. Cl.
*H01M 10/04* (2006.01)
*H01M 50/109* (2021.01)
(Continued)

(52) U.S. Cl.
CPC ... *H01M 10/0427* (2013.01); *H01M 10/0431* (2013.01); *H01M 50/109* (2021.01);
(Continued)

(58) Field of Classification Search
CPC ............ H01M 50/536; H01M 50/172; H01M 10/0427; H01M 50/109; H01M 50/153;
(Continued)

(56) References Cited

U.S. PATENT DOCUMENTS

| 4,830,940 A | 5/1989 | Keister et al. |
| 5,567,539 A | 10/1996 | Takahashi et al. |

(Continued)

FOREIGN PATENT DOCUMENTS

| CN | 102318122 A | 1/2012 | |
| CN | 109411642 A | * 3/2019 | .......... H01M 2/0222 |

(Continued)

OTHER PUBLICATIONS

International Search Report and Written Opinion in International Patent Application No. PCT/IB2019/057668 dated Dec. 17, 2019 (106 pages).

*Primary Examiner* — Matthew T Martin
*Assistant Examiner* — Jessie Walls-Murray
(74) *Attorney, Agent, or Firm* — Foley & Lardner LLP

(57) ABSTRACT

A rechargeable hearing aid battery includes a stack of active materials forming a core, a two-part casing including an inner casing and an outer casing, and a grommet. The grommet includes an opening through which a conductive tab extends. The conductive tab is configured to electrically connect an electrode of the core to one of the outer casing and the inner casing. The grommet is configured to insulate a portion of the tab from the core and to insulate the core from one of the outer casing and the inner casing. Furthermore, the grommet is configured to separate the inner casing from the outer casing and to seal a gap formed between the inner and outer casing.

15 Claims, 18 Drawing Sheets

(51) Int. Cl.
  *H01M 50/153* (2021.01)
  *H01M 50/181* (2021.01)
  *H01M 50/184* (2021.01)
  *H01M 50/186* (2021.01)
  *H01M 50/193* (2021.01)
  *H01M 50/528* (2021.01)
  *H01M 50/533* (2021.01)
  *H01M 50/534* (2021.01)
  *H01M 50/536* (2021.01)
  *H01M 50/545* (2021.01)
  *H01M 50/548* (2021.01)
  *H01M 50/56* (2021.01)

(52) U.S. Cl.
  CPC ....... *H01M 50/153* (2021.01); *H01M 50/181* (2021.01); *H01M 50/184* (2021.01); *H01M 50/186* (2021.01); *H01M 50/193* (2021.01); *H01M 50/528* (2021.01); *H01M 50/533* (2021.01); *H01M 50/534* (2021.01); *H01M 50/536* (2021.01); *H01M 50/545* (2021.01); *H01M 50/56* (2021.01); *H01M 50/548* (2021.01); *H01M 2220/30* (2013.01)

(58) Field of Classification Search
  CPC ............. H01M 50/181; H01M 50/193; H01M 50/183; H01M 50/528; H01M 50/538; H01M 50/545; H01M 50/56; H01M 50/548; H01M 50/186
  See application file for complete search history.

(56) References Cited

U.S. PATENT DOCUMENTS

| | | |
|---|---|---|
| 5,766,791 A | 6/1998 | Takahashi et al. |
| 5,958,617 A | 9/1999 | Kozuki et al. |
| 6,265,100 B1 | 7/2001 | Saaski et al. |
| 6,451,478 B1 | 9/2002 | Okahisa et al. |
| 6,468,691 B1 | 10/2002 | Malay et al. |
| 6,521,373 B1 | 2/2003 | Suzuki et al. |
| 6,537,693 B1 | 3/2003 | Suzuki et al. |
| 6,537,963 B1 | 3/2003 | Markert |
| 6,716,552 B2 | 4/2004 | Zhang et al. |
| 7,452,627 B2 | 11/2008 | Lee |
| 7,470,482 B2 | 12/2008 | Takamura et al. |
| 7,709,141 B2 | 5/2010 | Kim et al. |
| 7,842,414 B2 | 11/2010 | Hong et al. |
| 7,960,048 B2 | 6/2011 | Jang et al. |
| 7,993,778 B2 | 8/2011 | Yim et al. |
| 8,048,559 B2 | 11/2011 | Kim |
| 8,062,787 B2 | 11/2011 | Kim |
| 8,173,296 B2 | 5/2012 | Lee |
| 8,288,036 B2 | 10/2012 | Kim |
| 8,298,704 B2 | 10/2012 | Matsuhisa et al. |
| 8,394,533 B2 | 3/2013 | Bak |
| 8,399,125 B2 | 3/2013 | Kim |
| 8,409,736 B2 | 4/2013 | Wang et al. |
| 8,455,124 B2 | 6/2013 | Kim |
| 8,541,132 B2 | 9/2013 | Kim |
| 8,546,007 B2 | 10/2013 | Lee et al. |
| 8,673,485 B2 | 3/2014 | Yamazaki et al. |
| 8,679,672 B2 | 3/2014 | Yamaguchi et al. |
| 8,815,437 B2 | 8/2014 | Lee |
| 8,865,344 B2 | 10/2014 | Kim et al. |
| 8,940,435 B2 | 1/2015 | Kim et al. |
| 8,945,242 B2 | 2/2015 | Mineya et al. |
| 8,993,148 B2 | 3/2015 | Wang et al. |
| 9,005,802 B2 | 4/2015 | Humphrys et al. |
| 9,034,512 B2 | 5/2015 | Sato et al. |
| 9,083,053 B2 | 7/2015 | Humphrys |
| 9,178,188 B2 | 11/2015 | Lim |
| 9,178,190 B2 | 11/2015 | Kim et al. |
| 9,178,251 B2 | 11/2015 | Gaugler |
| 9,350,004 B2 | 5/2016 | Kim |
| 9,564,654 B2 | 2/2017 | Wang et al. |
| 9,614,247 B2 | 4/2017 | Ensling et al. |
| 9,748,550 B2 | 8/2017 | Kim |
| 9,755,203 B2 | 9/2017 | Kim et al. |
| 9,793,572 B2 | 10/2017 | Lee et al. |
| 9,799,858 B2 | 10/2017 | Gaugler |
| 9,799,913 B2 | 10/2017 | Pytlik et al. |
| 10,128,477 B2 | 11/2018 | Lee et al. |
| 10,164,306 B2 | 12/2018 | Allen et al. |
| 10,193,125 B2 | 1/2019 | Doo et al. |
| 10,283,750 B2 | 5/2019 | Lee et al. |
| 2003/0013014 A1 | 1/2003 | Ashihara et al. |
| 2003/0104275 A1 | 6/2003 | Ishida et al. |
| 2006/0279902 A1 | 12/2006 | Gallay et al. |
| 2007/0154804 A1* | 7/2007 | Kim ............. H01M 50/10 429/185 |
| 2008/0206628 A1 | 8/2008 | Honbou |
| 2008/0254354 A1 | 10/2008 | Adams |
| 2009/0029240 A1* | 1/2009 | Gardner ........... H01M 50/538 429/211 |
| 2009/0098445 A1 | 4/2009 | Kim |
| 2010/0291422 A1 | 11/2010 | Deng et al. |
| 2011/0091753 A1* | 4/2011 | Wang ............ H01M 50/528 429/94 |
| 2011/0250488 A1 | 10/2011 | Park |
| 2011/0262790 A1* | 10/2011 | Zhu ............. H01M 50/216 429/100 |
| 2012/0015224 A1 | 1/2012 | Pytlik et al. |
| 2012/0028110 A1 | 2/2012 | Brenner |
| 2012/0100406 A1* | 4/2012 | Gaugler ........... H01M 10/0436 429/94 |
| 2012/0247107 A1* | 10/2012 | Balk ............. H01M 50/289 429/100 |
| 2013/0230749 A1 | 9/2013 | Kim et al. |
| 2014/0045009 A1 | 2/2014 | Kim |
| 2014/0147716 A1 | 5/2014 | Oh et al. |
| 2014/0220394 A1 | 8/2014 | Kim et al. |
| 2014/0287298 A1 | 9/2014 | Sumihiro |
| 2014/0315061 A1* | 10/2014 | Wang ............ H01M 10/0587 429/94 |
| 2015/0118545 A1 | 4/2015 | Komatsu et al. |
| 2015/0140456 A1 | 5/2015 | Allen et al. |
| 2015/0236317 A1 | 8/2015 | Lee et al. |
| 2015/0236370 A1 | 8/2015 | Ensling et al. |
| 2016/0079584 A1 | 3/2016 | Lee et al. |
| 2016/0202556 A1 | 7/2016 | Lee et al. |
| 2017/0062778 A1 | 3/2017 | Mille et al. |
| 2017/0092926 A1 | 3/2017 | Doo et al. |
| 2017/0279087 A1 | 9/2017 | Tsuda et al. |
| 2017/0294641 A1 | 10/2017 | Lee et al. |
| 2018/0219199 A1 | 8/2018 | Lee et al. |
| 2018/0301668 A1 | 10/2018 | Nicholls |
| 2019/0165411 A1 | 5/2019 | Tu et al. |
| 2020/0220157 A1* | 7/2020 | Toshiro ............. H01M 4/0404 |

FOREIGN PATENT DOCUMENTS

| | | | |
|---|---|---|---|
| CN | 216563407 U * | 5/2022 | ............. Y02E 60/12 |
| JP | 10-064520 | 3/1998 | |
| JP | 2000156210 A * | 6/2000 | ............. Y02E 60/12 |
| JP | 2005-085556 A | 3/2005 | |
| JP | 2008-262826 A | 10/2008 | |
| WO | WO-0036693 A1 * | 6/2000 | ............. H01M 50/10 |
| WO | WO-2016/202556 A1 | 12/2016 | |

* cited by examiner

RECHARGEABLE HEARING AID BATTERY WITH SLOTTED GROMMET

CROSS-REFERENCE TO RELATED PATENT APPLICATIONS

This application claims the benefit of and priority to U.S. Provisional Patent Application No. 62/729,933, filed Sep. 11, 2018, and to U.S. Provisional Patent Application No. 62/733,599, filed Sep. 19, 2018, the disclosures of which are incorporated by reference in their entireties herein.

FIELD

The present technology relates generally to batteries. More particularly, the technology relates to rechargeable batteries for use in hearing aid devices.

SUMMARY

In an embodiment, a rechargeable hearing aid battery is provided that includes an active core, a two-part casing, and a grommet or insulating layer. The casing includes an inner casing and an outer casing that together form a housing for the core. The grommet electrically insulates the two casings from one another and also insulates the core from the outer casing. A first electrode of the core is electrically connected to the inner casing (e.g., via a central mandrel that is welded to the inner casing), while a second electrode of the core is electrically connected to the outer casing using a conductive tab that extends through an opening in the grommet. The grommet also insulates the conductive tab from the core.

In the above embodiment, the opening may be a rectangular slot disposed in a bottom wall of the grommet. In any of the above embodiments, the core may be manufactured from multiple layers of active material wound around a central mandrel.

Another embodiment is a method of assembly for a rechargeable hearing aid battery, the method including welding the first electrode of a stack of active materials to the mandrel, winding the stack in a spiral configuration around the mandrel to form the core, inserting the core into the housing, inserting the conductive tab through the opening in the grommet, and fitting the inner casing and outer casing together. This method may further include welding the mandrel to the inner casing and welding the conductive tab to the outer casing.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
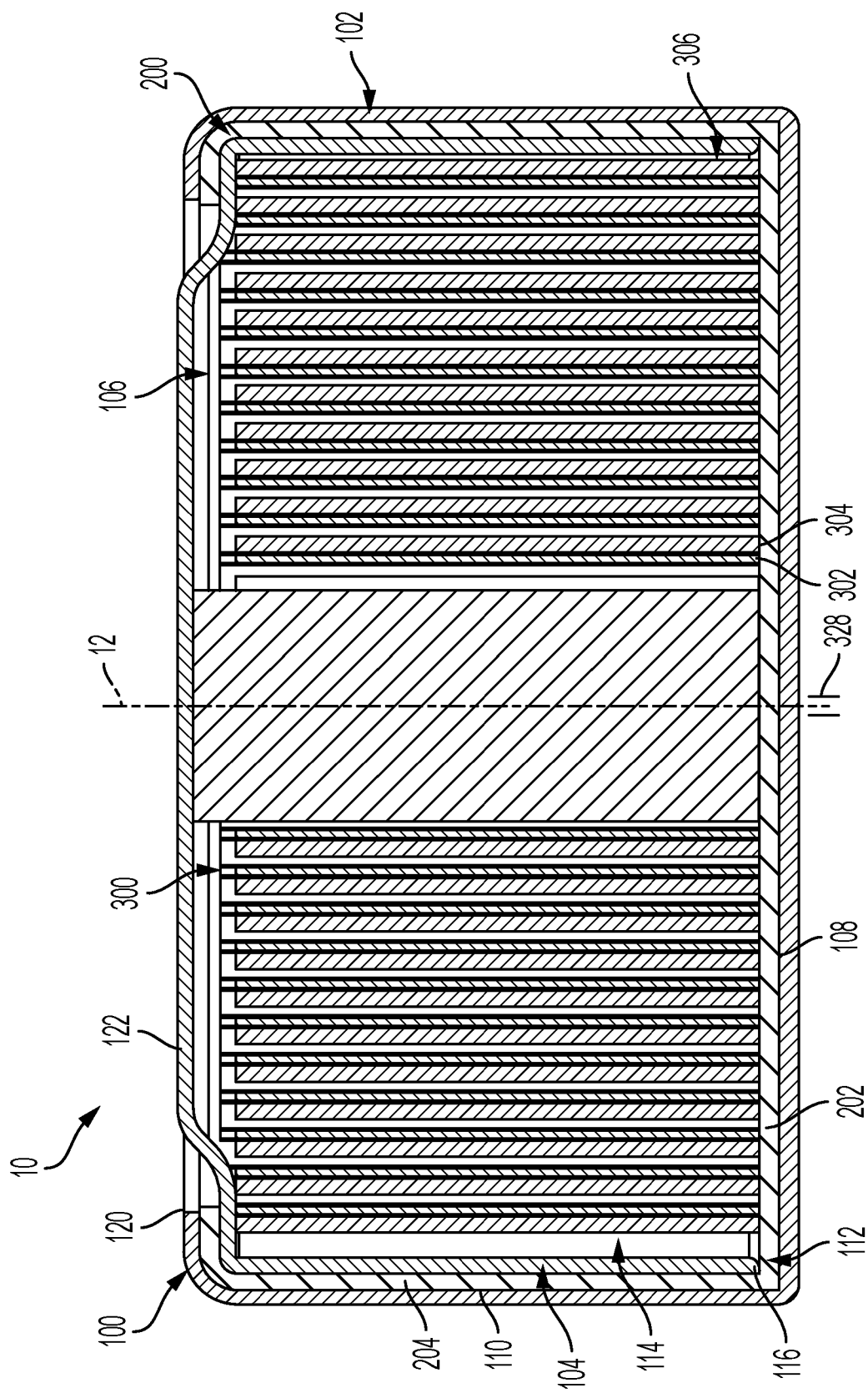
FIG. 1 is a side sectional view of a rechargeable hearing aid battery, according to an illustrative embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

Referring to the figures generally, the various illustrative embodiments disclosed herein relate to a rechargeable battery that may be utilized in a variety of applications, systems, and devices, particularly those that require a power source having a very high volumetric energy density. Specifically, the rechargeable battery is utilized to power a hearing aid for a person who may be partially deaf. The battery includes a housing containing active materials for the battery. The housing includes an outer metal cup and an inner metal cup. These components are insulated from one another in certain areas to prevent short circuiting within the battery (e.g., to prevent short circuiting between the outer metal cup and the inner metal cup, to prevent short circuiting between the active core and the housing, and to insulate the electrical connections formed between certain parts of the active core and the housing). Traditionally, these components are separated from one another using multiple pieces of insulating material whose placement within the battery complicates the manufacturing process and increases cost. The devices of the present disclosure utilize a single piece molded polymer grommet or insulator to control the flow of current in the electrical circuit. The molded polymer grommet is a single piece insulator that is contoured to an inner surface of the outer metal cup. The molded polymer grommet serves multiple functions including sealing the housing, insulating the housing pieces from one another, and insulating the active materials from the housing.

The active core of the battery is of a lithium-ion chemistry and is arranged to maximize the interfacial area between active materials, including a first electrode and a second electrode. The first electrode of the active core may be electrically coupled to a central mandrel about which the first electrode, the second electrode, and the required separating layers are wound. The mandrel may be coupled to an inner metal cup or, alternatively, to an outer metal cup. In various embodiments, other types of current collectors (e.g., a conductive tab separate from or part of the first electrode) may be used to couple the first electrode to the inner or outer metal cup. The second electrode of the core is electrically connected to the outer metal cup using a single conductive tab or mandrel that extends through a small opening in the grommet. In embodiments including a tab, the tab is sandwiched between the outer metal cup and the grommet, which insulates the tab from other parts of the active core. The details of the general depiction provided above will be more fully explained by references to FIGS. 1-14.

FIG. 1 shows a fully assembled battery, shown as battery 10, according to an illustrative embodiment. In some embodiments, the battery 10 is a rechargeable battery for a hearing aid device, although the battery 10 could be used in any small device that requires a power source with high volumetric energy density. In the embodiment of FIG. 1, the battery 10 is constructed in the form of a button cell (e.g., a cylindrical cell of 1 cubic centimeter or less external volume, as measured from the outer surfaces of the cell). An aspect ratio of the battery, characterized as the height of the battery (e.g., along the axis 12 of the battery) divided by the diameter (e.g., the outer diameter) of the battery 10, is less than 1.

As shown in FIG. 1, the battery 10 includes a casing 100, which includes an outer casing, shown as lower cup 102, and an inner casing, shown as upper cup 104, and a grommet, shown as insulating layer 200. The battery 10 also includes a core, shown as active core 300, that is contained within an internal volume 106 of the casing 100 (e.g., between the lower cup 102 and the upper cup 104).

In an illustrative embodiment, the active core 300 of the battery 10 includes active materials of lithium-ion chemistry. More specifically, the active core 300 is arranged to provide a high interfacial area between two electrodes, shown as first electrode sheet 302 and second electrode sheet 304. In another embodiment, the active core 300 is a different rechargeable chemistry that requires a high interfacial area to provide enhanced volumetric rate capabilities. The active core 300 is arranged as a series of thin layers of material stacked on top of one another, shown as stack 306, which is wound into a spiral "jelly roll" configuration about a central mandrel 308.

Figure 2:
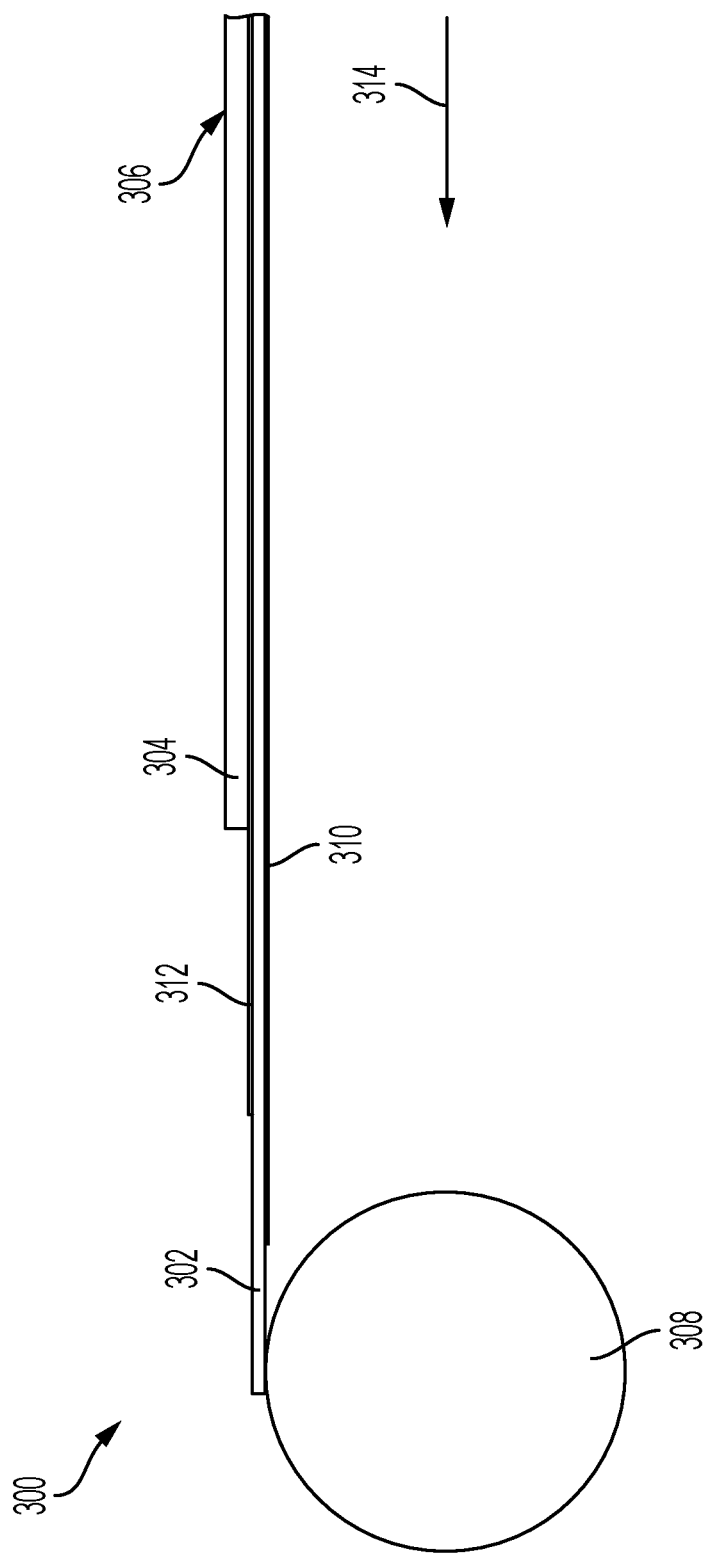
FIG. 2 is a side view of a plurality of active materials for a hearing aid battery, prior to winding, according to an illustrative embodiment.
Figure 3:
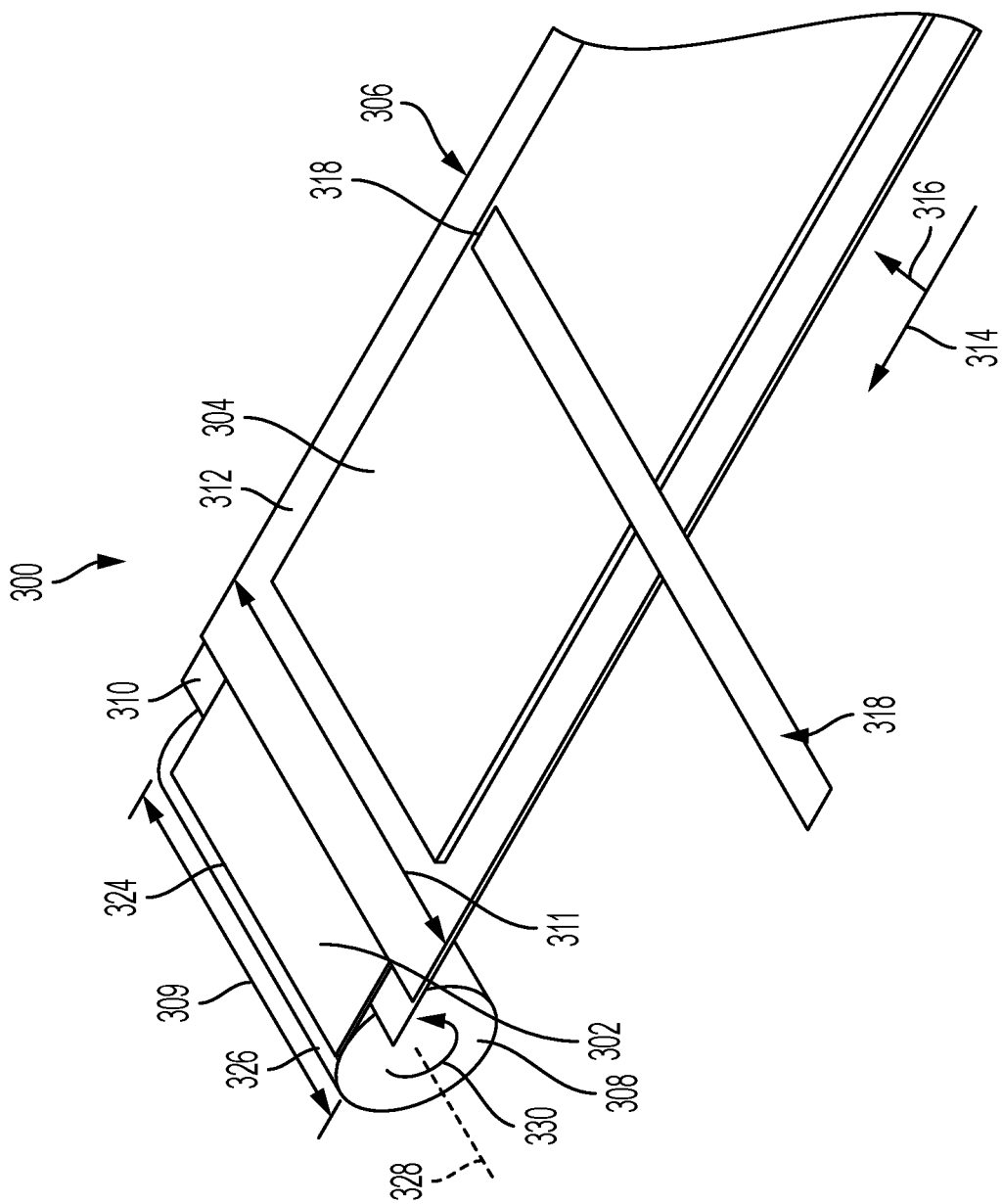
FIG. 3 is a perspective view of the active materials of FIG. 2, including a conductive tab, according to an illustrative embodiment.

An embodiment of the active core 300 is shown in FIGS. 2 and 3, prior to a winding step in a manufacturing process for the active core 300. The mandrel 308 is made from a single piece of conductive material (e.g., stainless steel, etc.). In other embodiments, the mandrel 308 may additionally include an insulating coating or film on one end so as to prevent short circuiting of the mandrel 308 against the lower or upper cup 102, 104. In an illustrative embodiment, the mandrel 308 takes the form of a solid cylinder. In other embodiments, the mandrel is formed in a different shape. In yet other embodiments, the mandrel 308 is made from a single piece of insulating material (e.g., polypropylene) and used in conjunction with a first plurality of thin strips of material that extend between the first electrode sheet 302 and the upper cup 104, and a second plurality of thin strips of material that extend between the second electrode sheet 304 and the lower cup 102. In yet other embodiments, this orientation may be reversed. In yet other embodiments, the mandrel is replaced by a thin strip of material that extends between the first electrode sheet 302 and the upper cup 104. In the embodiment of FIGS. 2 and 3, the mandrel 308 is a solid cylinder with a diameter of between approximately 2 mm and 1.5 mm, inclusive, although other diameters may alternatively be used. Among other benefits, a smaller diameter mandrel 308 allows for more "wraps" of the stack 306 around the mandrel 308. As shown in FIG. 3, a height 309 of the mandrel 308 (i.e., the length of the mandrel 308 in a direction parallel to the central axis 328 of the mandrel 308) is greater than a dimension 311 of the stack 306 that is wound about the mandrel 308 (e.g., the dimension 311 of and edge of the stack 306 that is parallel to the central axis 328). It will be understood that in some embodiments, the relative positioning of the anode and cathode may be reversed without affect. For example, in an alternative embodiment (not shown), the mandrel may be connected to the lower cup while the tab is connected to the upper cup. Thus, although the relative positioning changes, and the polarity of the cups would change, the connection is merely the opposite of that described in the figures.

Figure 17:
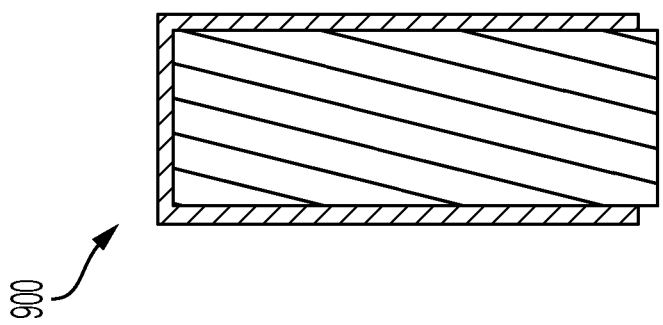
FIG. 17 is a side cross-sectional view of a tension rod mandrel including an inner portion with viscoelastic properties, according to an illustrative embodiment.
Figure 16:
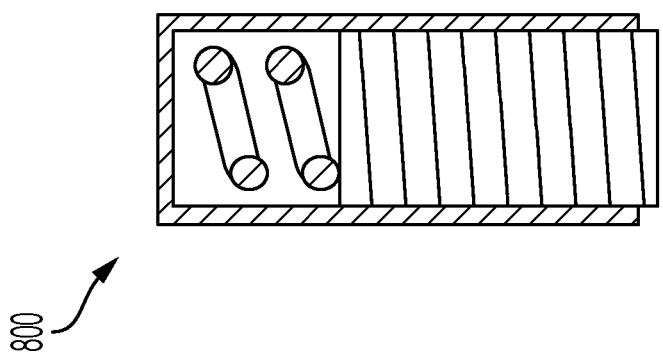
FIG. 16 is a side cross-sectional view of a tension rod mandrel including a solid inner portion, according to an illustrative embodiment.
Figure 15:
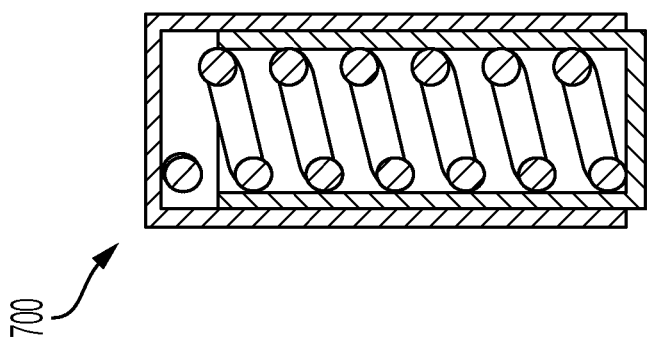
FIG. 15 is a side cross-sectional view of a tension rod mandrel including a hollow inner portion, according to an illustrative embodiment.

FIGS. 15-17 show various alternative embodiments of a mandrel 700, 800, 900 for a rechargeable battery. In the embodiments of FIG. 15, the mandrel 700 is configured as a tension rod mandrel including two pieces of conductive material including a hollow first ("outer") portion and a hollow second ("inner") portion contained therein. Together, the first and second portions form a cavity (e.g., hollow encasement). The cavity may be configured to receive a spring so as to provide some adjustability to a length of the mandrel 700 (e.g., a length of the mandrel 700 in a direction substantially parallel to a central axis of the mandrel 700) so as to accommodate small geometric variations in the assembly. In other embodiments, the first portion is made from a conductive material and the second portion is made from an insulating material. The first portion may be electrically coupled to the first electrode and the upper cup, while the second portion contacts the lower cup. In yet other embodiments, the second portion may be made from a conductive material electrically insulated from the lower cup (e.g., insulated by an insulating material such as kapton tape, etc.). In yet other embodiments, these elements can be configured differently (e.g., reversed, etc.). In yet another embodiment, as shown in FIGS. 16-17, the inner portion may be configured as a solid rod. In yet other embodiments, as shown in FIG. 17, the inner portion is an insulating material having viscoelastic properties to provide spring-like behavior (as opposed to using a separate spring between the outer and inner portions).

As shown in FIG. 2, the stack 306 includes alternating layers of material including the first electrode sheet 302, the second electrode sheet 304, and at least one separator layer, shown as first separator layer 310 and second separator layer 312. In the embodiment of FIGS. 2 and 3, the first electrode sheet 302 is an anode for the battery 10 (see also FIG. 1), while the second electrode sheet 304 is a cathode. In yet other embodiments, the configuration is reversed (e.g., the first electrode sheet 302 is a cathode for the battery 10, while the second electrode 304 is an anode). The separator layers 310, 312 are the boundary between the anode and cathode, and the electrolyte of the battery circuit (e.g., made from a lithium salt or organic solvent) wets the separator layers 310, 312.

The first separator layer 310 and the second separator layer 312 are disposed between the electrode sheets 302, 304 and at least partially insulate the electrode sheets 302, 304 from one another. In the embodiment of FIG. 2, the first separator layer 310 and the second separator layer 312 are disposed on opposite sides of the first electrode sheet 302. In yet other embodiments, the first separator layer 310 and second separator layer 312 are disposed on opposite sides of the second electrode sheet 304.

To facilitate winding of the stack 306 about the central mandrel 308, the first electrode sheet 302 extends in a substantially longitudinal direction 314 (e.g., the winding direction) beyond a leading edge of the first separator layer 310, the second separator layer 312, and the second electrode sheet 304. At a trailing edge of the stack 306 (not shown), each of the separator layers 310, 312 may be longer than the electrode sheets 302, 304. For example, each of the first separator layer 310 and the second separator layer 312 may extend beyond the trailing edge of each of the first electrode sheet 302 and the second electrode sheet 304 to provide an extra wrap or two of each of the separator layers 310, 312 (e.g., so that each of the separator layers 310, 312 wrap on to themselves, etc.). The trailing edge of the separators layers 310, 312 may be heat staked in place to prevent the stack 306 from unwinding. In some embodiments, a length of the cathode (e.g., the second electrode sheet 304) in a substantially longitudinal direction is greater than a length of the anode (e.g., the first electrode sheet 302). In other embodiments, the length of the anode in a substantially longitudinal direction is greater than the length of the cathode. Note that the winding direction and stack orientation both impact the length of the electrodes 302, 304.

In the embodiment of FIG. 3, the width of each of the separator layers 310, 312 in a lateral direction 316 (e.g., a direction that is substantially perpendicular to the longitudinal direction 314) is greater than the width of the electrodes 302, 304 in the lateral direction 316. This difference in width ensures that the first and second electrodes 302, 304 are separated once assembled into the battery.

Figure 21:
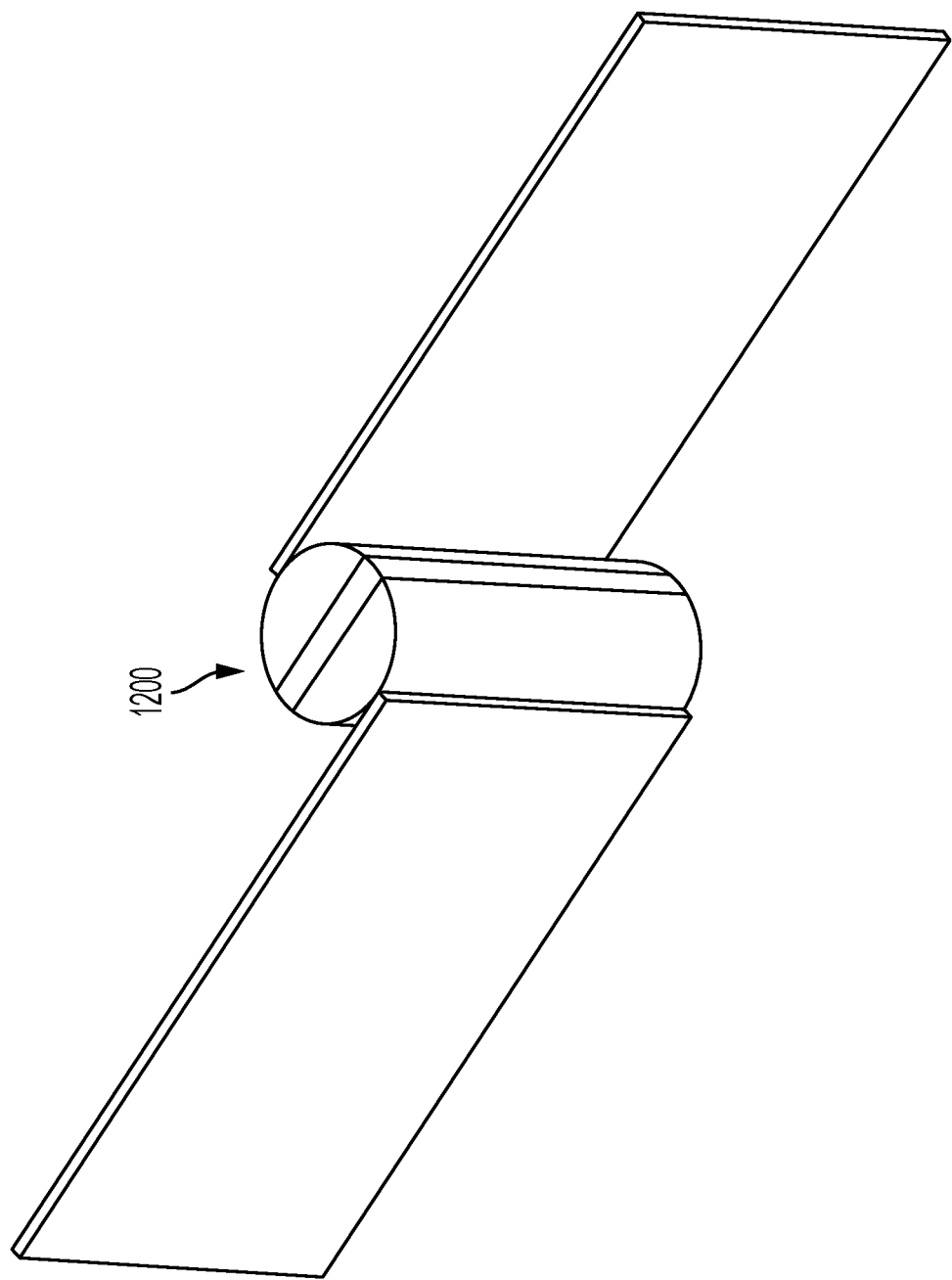
FIG. 21 is a perspective view of a multi-piece mandrel, according to an illustrative embodiment.

In other embodiments, the active core may be configured differently. In an illustrative embodiment, as shown in FIG. 21, the active core includes a multi-piece mandrel 1200 made from multiple different materials. In the embodiment of FIG. 21, the mandrel 1200 includes a separator (e.g., a piece of insulating material) that cuts through a center of the mandrel 1200 (parallel to a central axis of the mandrel 1200). The electrodes 302, 304 are welded to opposite portions of the mandrel 1200, such that they are electrically coupled to the opposing portions. In the embodiment of FIG. 21, one or both portions of the mandrel 1200 may be configured to contact the appropriate part of the casing (e.g., the lower cup 102 or the upper cup 104), or be otherwise electrically coupled to the appropriate part of the casing.

Figure 20:
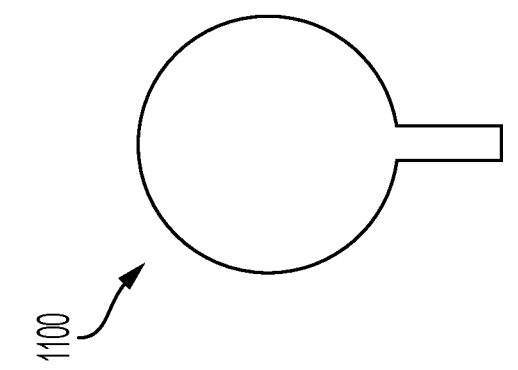
FIG. 20 is a top view of a conductive tab for a rechargeable hearing aid battery, according to another illustrative embodiment.
Figure 19:
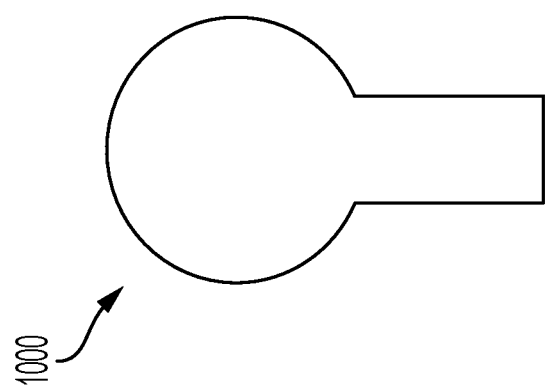
FIG. 19 is a top view of a conductive tab for a rechargeable hearing aid battery, according to an illustrative embodiment.

In the embodiment of FIG. 3, the stack 306 includes a tab, shown as tab 318 having a first end 320 and a second end 322. The tab 318 is made from a conductive piece of metal (e.g., titanium, aluminum, nickel, etc.) and is configured to electrically connect the second electrode sheet 304 to the lower cup 102 (see also FIG. 8). As shown in FIG. 3, the first end of the tab 318 is attached (e.g., brazed, etc.) to the second electrode sheet 304 and extends laterally outward such that it protrudes a distance beyond the ends of the electrodes 302, 304 and separator layers 310, 312. In an embodiment, the tab 318 is a thin strip of material formed (e.g., stamped, cut, or otherwise formed) in the shape of a rectangle. In the embodiment of FIG. 3, the thickness of the tab 318 is on the order of the thickness of the separator layers 310, 312. In yet another embodiment, the tab 318 is configured to electrically connect the second electrode 304 to the upper cup 104. In this embodiment, the tab may be oriented either longitudinally 314 or laterally 316 (e.g., radially) outward. In yet another embodiment, the tab 318 is configured to electrically connect the first electrode sheet 302 to the upper cup 104 or lower cup 102. In yet another embodiment, as shown in FIGS. 19-20, the tab 1000, 1100 can be in the shape of a paddle such that the round portion extends laterally outward toward upper cup 104 or lower cup 102, such that a rounded portion of the tab 1000, 1100 is in contact with the upper cup 104 or lower cup 102, so as to provide a larger contact area between the tab 1000, 1100 and the upper cup 104 or lower cup 102. In yet another embodiment, the tabs 1000, 1100 may be partially insulated by application of insulating tape, such as Kapton tape.

Figure 4:
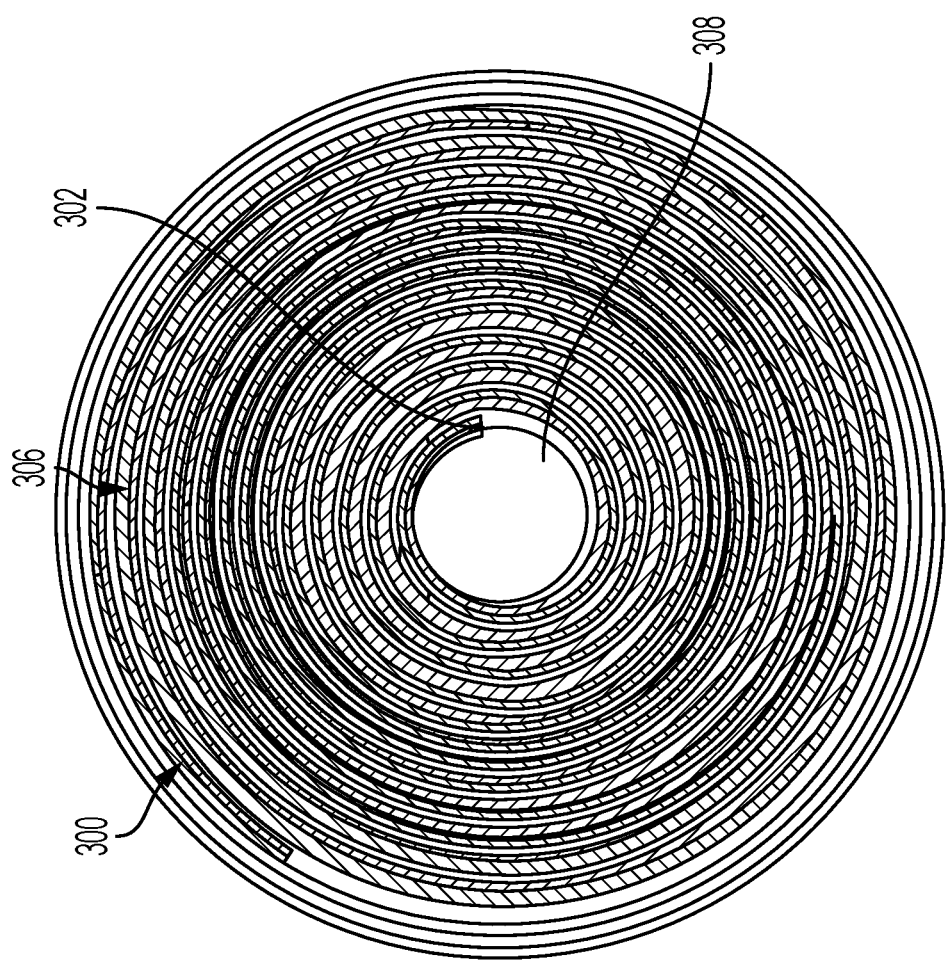
FIG. 4 is a top sectional view of the rechargeable hearing aid battery of FIG. 1, according to an illustrative embodiment.

As shown in FIG. 4, the stack 306 is wound about the mandrel 308 in a spiral configuration. A method of assembly for the active core 300 includes electrically connecting (e.g., by welding, brazing, etc.) the first electrode sheet 302 to the mandrel 308. In the illustrative embodiment shown in FIG. 3, a leading edge 324 of the first electrode sheet 302 is welded to an outer surface 326 of the mandrel 308 along a reference line that is substantially parallel to the central axis 328 of the mandrel 308. Next, the stack 306 is wound around the mandrel 308 in a spiral configuration. As shown in FIG. 3, the winding process includes rotating the mandrel 308 in a winding direction 330 (e.g., counter-clockwise) until the stack 306 is fully wound onto the mandrel 308. Among other benefits, the spiral wound configuration may increase the stack pressure (i.e. the contact pressure between layers) and the interfacial area between the first electrode sheet 302 and the second electrode sheet 304, thereby increasing the maximum volumetric energy density of the active core 300.

Returning now to FIG. 1, the active core 300 is fully contained within the casing 100 for the battery 10. The casing 100 is formed from two parts, including the lower cup 102 and the upper cup 104. In an illustrative embodiment, both the lower cup 102 and the upper cup 104 are made from a single piece of material (e.g., stainless steel) that is stamped or otherwise formed into a cup shape. The inner surfaces of the lower cup 102 define a lower cavity 112, while the interior surfaces of the upper cup 104 define an upper cavity 114. The outer diameter of the upper cup 104 is less than the inner diameter of the lower cup 102 such that the upper cup 104 may be inserted into the lower cavity 112.

As shown in FIG. 1, the insulating layer 200 is a single piece of material that separates the lower cup 102 from the upper cup 104. Among other functions, the insulating layer 200 is configured both to electrically insulate the lower cup 102 from the upper cup 104 and to seal the interior of the casing 100 from the outside environment. The insulating layer 200 is made from an electrically insulating material such as polypropylene or another molded polymer. The insulating layer 200 may be molded or otherwise formed into a cup shape that fits substantially within the lower cavity 112. In addition to insulating the lower cup 102 from the upper cup 104, the insulating layer 200 also separates and electrically insulates the active core 300 from the lower cup 102. As shown in FIG. 1, the insulating layer 200 is formed to contact or nearly contact the inner surfaces of the lower cup 102. A bottom wall 202 of the insulating layer 200 is disposed proximate to a lower inner surface 108 of the lower cup 102, while a side wall 204 of the insulating layer 200 is disposed proximate to an inner side wall 110 of the lower cup 102. Among other benefits, the single piece design of the insulating layer 200 and the arrangement of the insulating layer 200 relative to the lower cup 102 simplify the molding process for the insulating layer 200.

Figure 5:
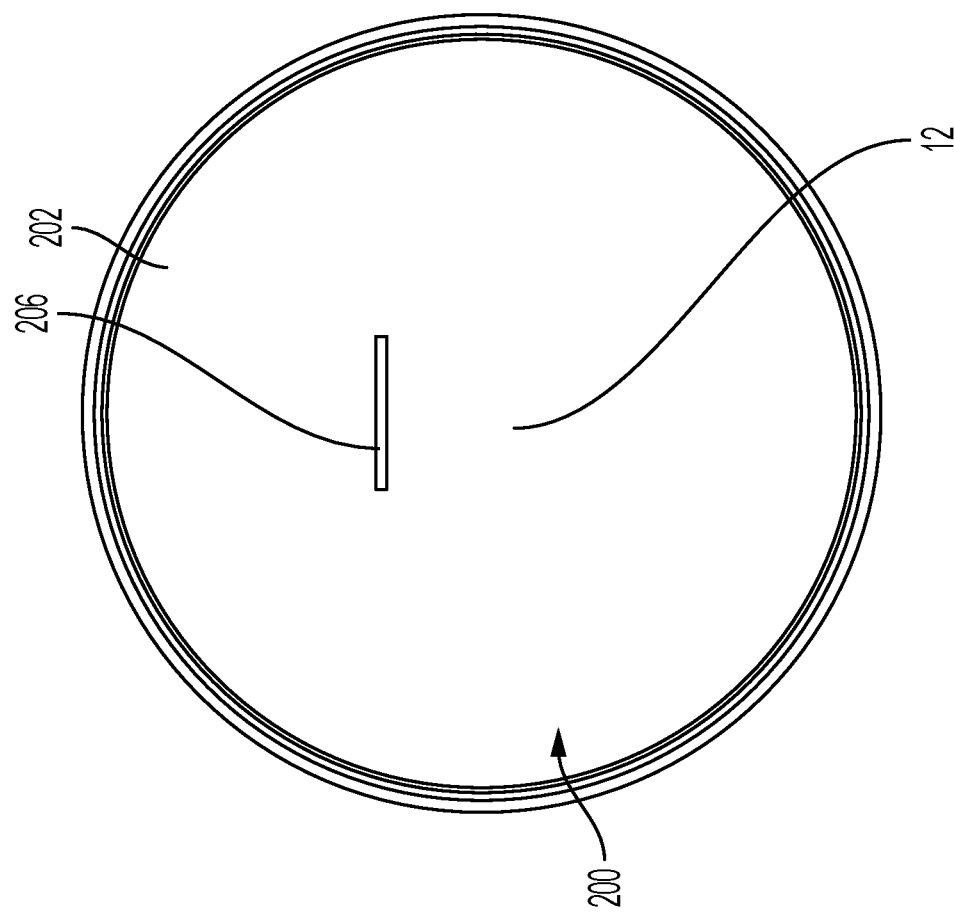
FIG. 5 is a bottom sectional view of a grommet of the rechargeable hearing aid battery of FIG. 1, showing an opening through a bottom wall of the grommet, according to an illustrative embodiment.
Figure 6:
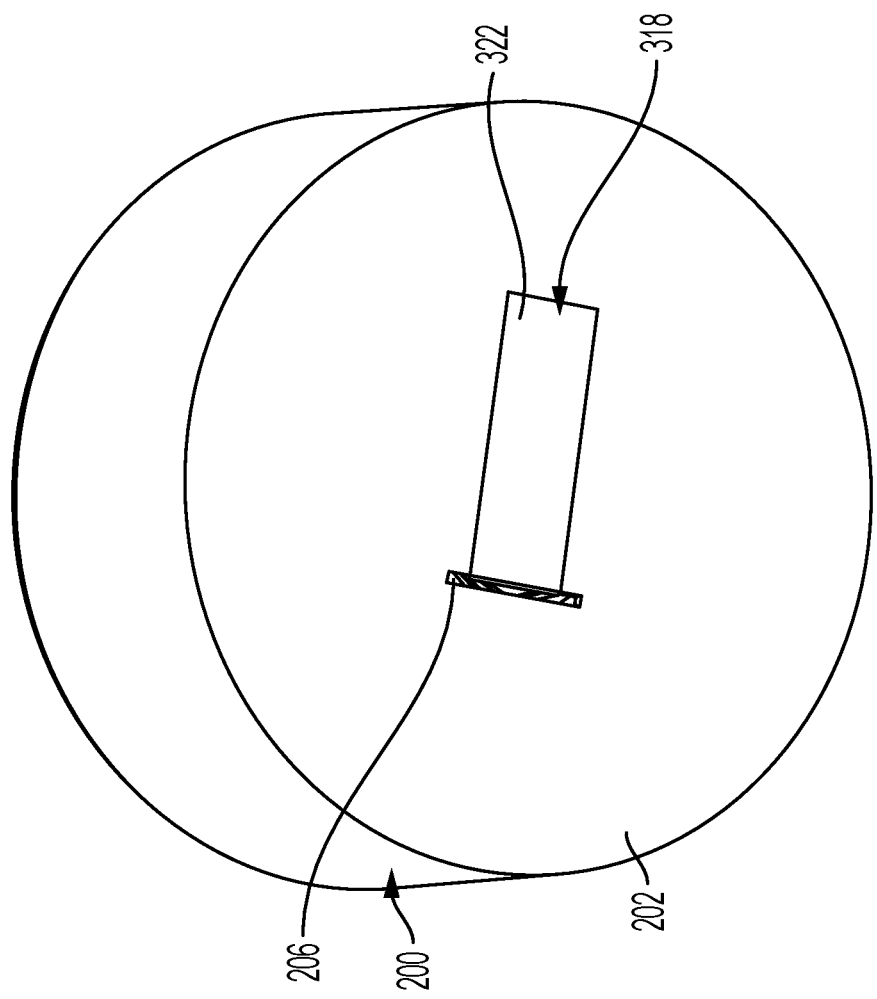
FIG. 6 is a bottom perspective view of the hearing aid battery of FIG. 1, with an outer casing removed, showing the conductive tab that extends through the opening in the grommet.

FIG. 5 shows a bottom view of the insulating layer 200, according to an illustrative embodiment. The insulating layer 200 includes an opening, shown as slot 206, disposed in the bottom wall 202 of the insulating layer 200. The slot 206 is configured to receive the second end 322 of the tab 318, which extends through the slot 206 and is electrically connected to the lower cup 102. The slot 206 provides a mechanism for connecting the tab 318 to the lower cup 102, while ensuring the second end 322 of the tab 318 is electrically insulated (by the insulating layer 200) from other parts of the active core 300. In an illustrative embodiment, the bottom wall 202 is solid other than the slot 206. The slot 206 is located adjacent to a central position of the bottom wall 202, proximate to the axis 12 of the battery 10. The location of the slot 206 in the bottom wall 202 (e.g., the rotational position of the slot 206, the distance between the slot 206 and the axis 12 of the battery 10, etc.) may be different depending on the configuration of the active core 300. In the embodiment of FIG. 5, the slot 206 is a rectangular slot. In other embodiments, the slot 206 may be circular or any other suitable shape. As shown in FIG. 6, the slot 206 is sized to receive the second end 322 of the tab 318. More specifically, a height of the slot 206 is greater than a thickness of the second end of the tab 318 and a width of the slot 206 is greater than a width of the second end 322 of the tab 318. In yet other embodiments, as shown for the rechargeable hearing aid battery 20 of FIG. 18, the slot may be a shape (e.g., a circular opening, etc.) configured to receive an end of the mandrel to provide a mechanism for connecting the mandrel 308 to the lower cup 102, while ensuring the active core 300 is electrically insulated from the lower cup 102. In yet other embodiments, the slot may be a different shape.

The method of assembly of the battery 10 further includes inserting the active core 300 into one of the upper cavity 114 and the lower cavity 112, such that the central axis 328 of the mandrel 308 is aligned with the axis 12 of the battery 10. In the embodiment of FIG. 1, the mandrel 308 is electrically connected to the upper cup 104 (e.g., by welding, brazing, etc.). As a result of the height difference between the mandrel 308 and the stack 306, it is only the mandrel 308 that contacts the upper cup 104. The method of assembly further includes inserting the second end 322 (see FIG. 8) of the tab 318 through the slot 206 of the insulating layer 200.

The second end 322 of the tab 318 is electrically connected (e.g., welded, brazed, etc.) to the lower inner surface 108 of the lower cup 102. It will be understood that in some embodiments, the relative positioning of the anode and cathode may be reversed. For example, in an alternative embodiment (not shown), the mandrel may be connected to the lower cup while the tab is connected to the upper cup. Thus, although the relative positioning changes, and the polarity of the cups would change, the connection is merely the opposite of that described in the figures.

Figure 18:
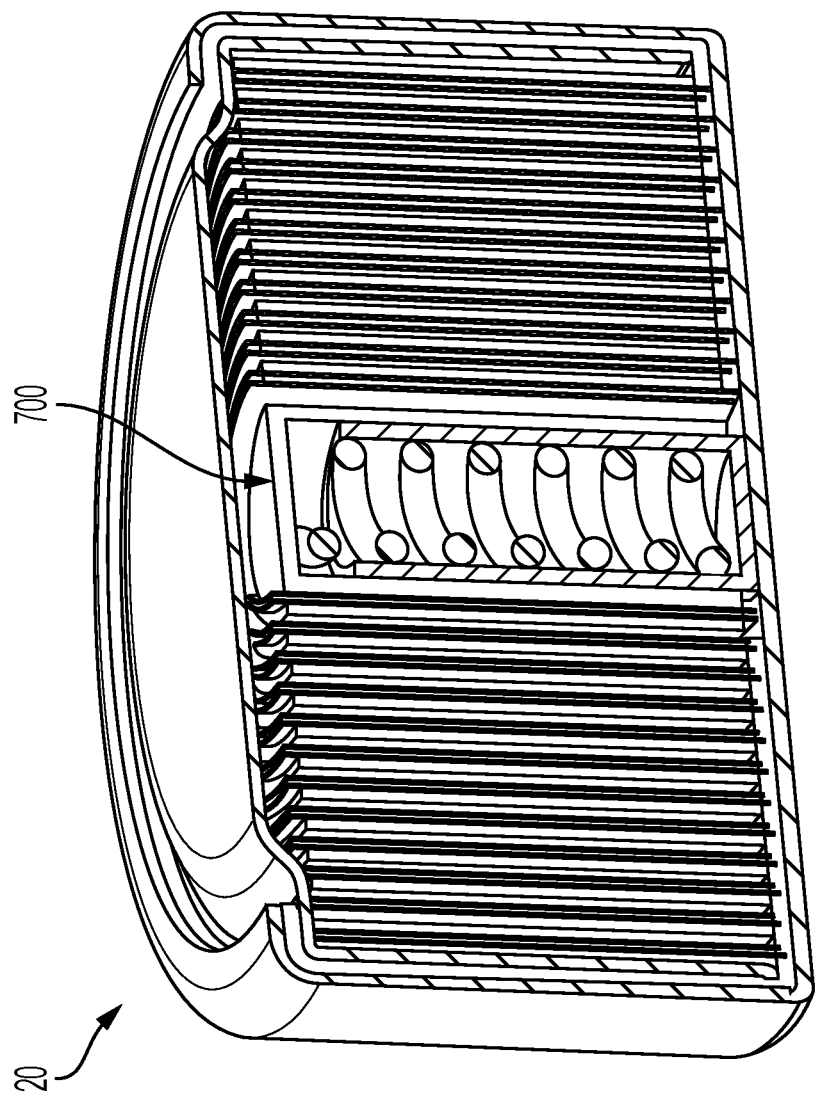
FIG. 18 is a perspective cross-sectional view of a rechargeable hearing aid battery including a tension rod mandrel, according to an illustrative embodiment.

In yet other embodiments, as shown in FIG. 18, the method of assembly further includes inserting an end of the mandrel through the slot of the insulating layer. As shown in FIG. 18, the mandrel is electrically connected to the lower cup 102 (e.g., by welding, brazing, etc.). As a result of the height difference between the mandrel and the stack, it is only the mandrel that contacts the lower cup 102. In the embodiment of FIG. 18, the second end 322 of the tab 318 is electrically connected (e.g., welded, brazed, etc.) to the top wall 122 of the upper cup 104. In yet other embodiments, the upper cup 104 may contain a slot in which the second end 322 of tab 318 is received and welded such that the casing is sealed and the second end 322 of tab 318 is electrically connected to the upper cup 104. In yet other embodiments, assembly may include the application of an insulator (e.g., Kapton) to the active core (e.g., above the active core) such that it does not contact the top wall 122 of the upper cup 104.

Figure 7:
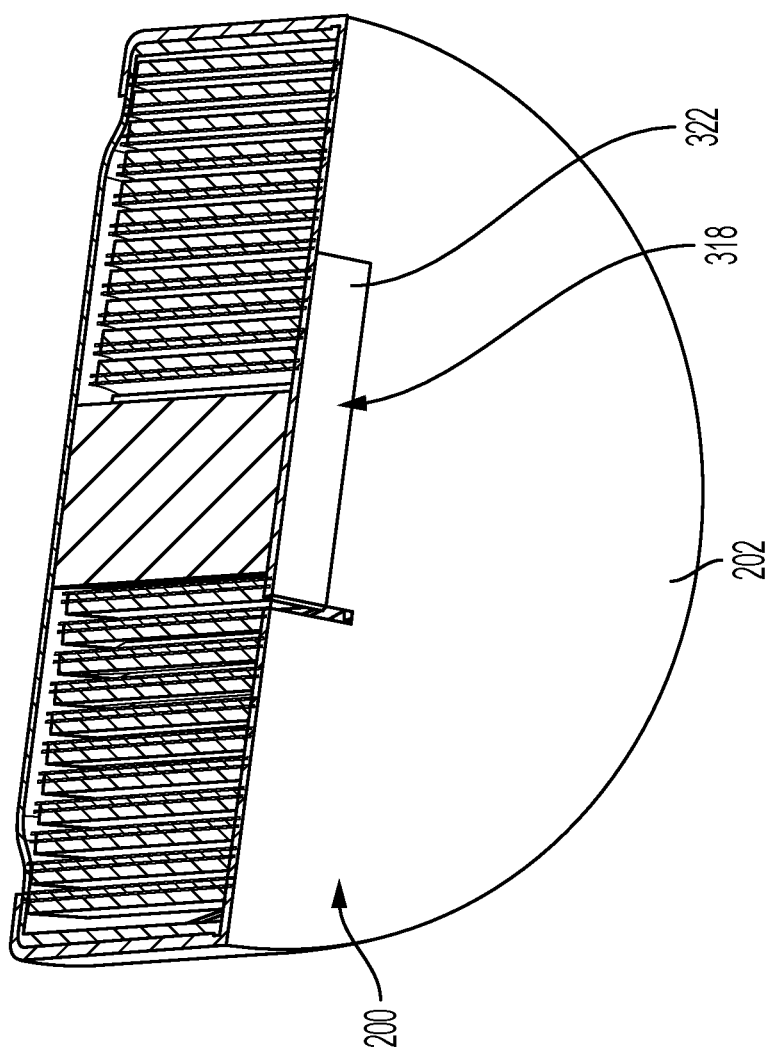
FIG. 7 is a reproduction of FIG. 6 at a cross section through the axis of the mandrel, according to an illustrative embodiment.
Figure 8:
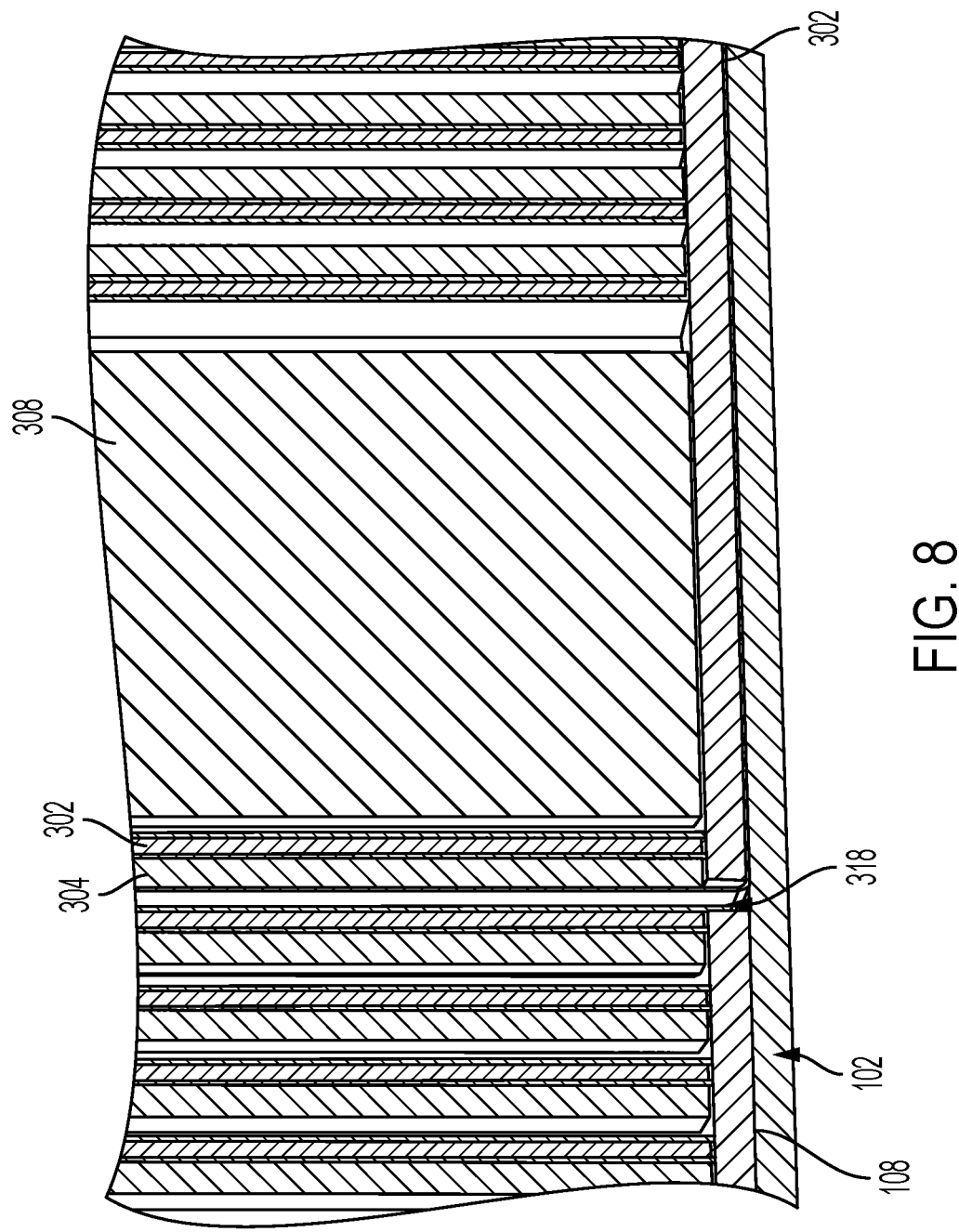
FIG. 8 is a side view of the rechargeable hearing aid battery shown in FIG. 6, including the outer casing, according to an illustrative embodiment.

According to the illustrative embodiments shown in FIGS. 7-8, the second end 322 of the tab 318 is folded over onto the bottom wall 202 of the insulating layer 200 where it exits the bottom wall 202. Once assembled, the tab 318 is sandwiched between the bottom wall 202 and the lower inner surface 108 (see FIG. 8) of the lower cup 102. In this configuration, the insulating layer 200 electrically insulates the portion of the tab 318 that is sandwiched between the insulating layer 200 and the lower cup 102 from all components except for the lower cup 102.

As shown in FIG. 1, the method of assembly further includes fitting the upper cup 104 to the lower cup 102 such that the lower cup 102 at least partially surrounds the upper cup 104. In the embodiment of FIG. 1, a lower edge 116 of the upper cup 104 contacts the bottom wall 202 of the insulating layer 200. Next, the upper cup 104 is fitted into the lower cup 102 such that the upper cup 104 is contained at least partially within the lower cavity 112. As shown in FIG. 1, the walls of the lower cup 102 and the upper cup 104 are separated by the insulating layer 200. Once assembled, the insulating layer 200 also separates both the inner side wall 110 and the lower inner surface 108 of the lower cup 102 from the active core 300.

As described in the embodiment of FIGS. 1-8 above, the single piece insulating layer 200 serves at least four functions, including: i) to electrically insulate the active core 300 from the lower cup 102, ii) to electrically insulate the second end 322 of the tab 318 from the active core 300, iii) to electrically insulate the lower cup 102 from the upper cup 104, and iv) to seal the gap between the lower cup 102 and the upper cup 104. The active core 300 resides within the internal volume 106 of the casing 100, which is defined, in first part, by the upper cavity 114 of the upper cup 104 and, in second part, by the bottom wall 202 of the insulating layer 200.

As shown in FIG. 1, the upper cup 104 and active core 300 are fixed in position relative to the lower cup 102 by folding or crimping an upper edge 120 of the lower cup 102 over a top wall 122 of the upper cup 104.

Figure 9:
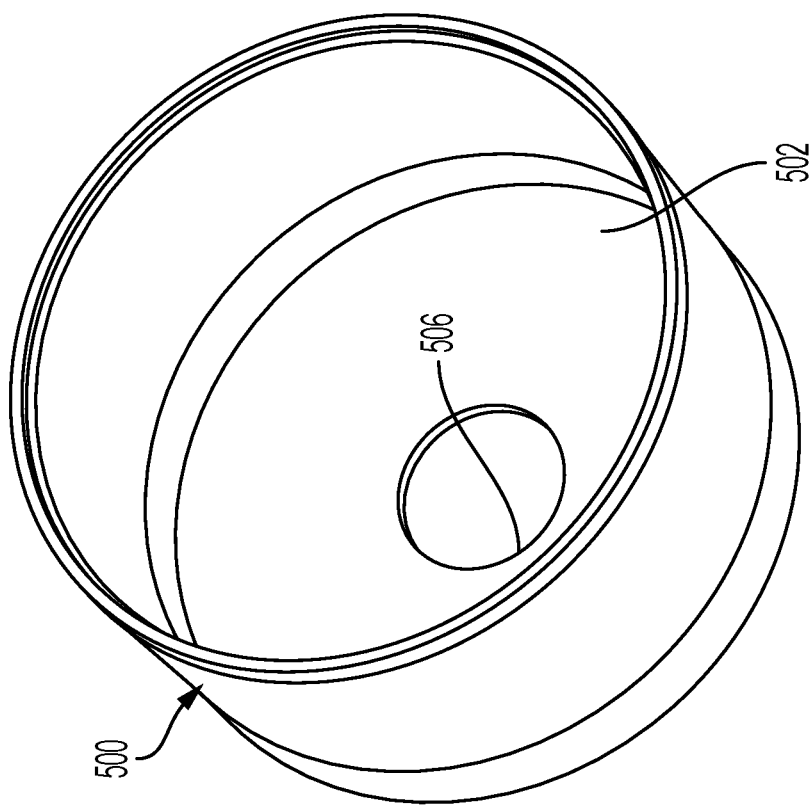
FIG. 9 is a perspective view of a grommet of a rechargeable hearing aid battery, according to an illustrative embodiment.
Figure 10:
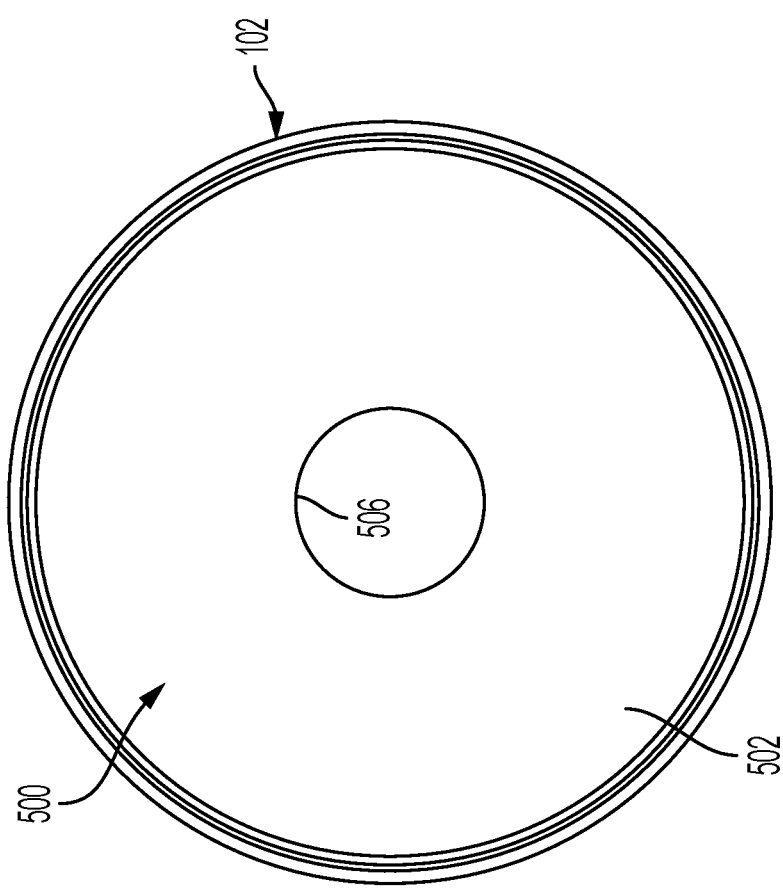
FIG. 10 is a bottom sectional view of a housing and grommet for a rechargeable hearing aid battery, according to an illustrative embodiment.

FIGS. 9-14 show illustrative embodiments of hearing aid batteries 14, 18 that each include a single piece insulating layer 500 including a circular slot 506. As shown in FIGS. 9-10, the circular slot 506 is disposed centrally through the bottom wall 502 of the insulating layer 500 such that the slot 506 is coaxial with the battery 14. As with the embodiment of FIGS. 1-8, the insulating layer 500 is made from a single piece of material and serves to electrically isolate (e.g., insulate) various components of an active core and a casing from one another. The insulating layer 500 also seals an inner volume of the casing (e.g., where an active core 300, 600 is located) from the environment.

Figure 11:
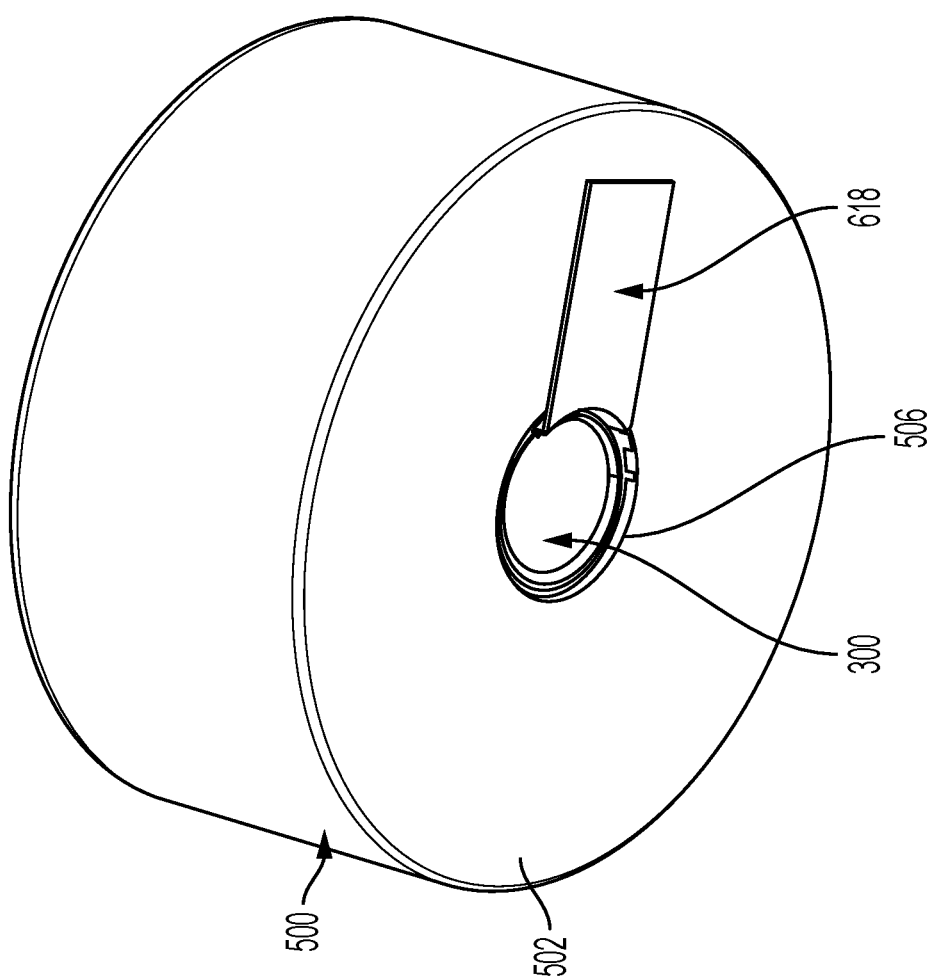
FIG. 11 is a bottom perspective view of a hearing aid battery with an outer casing removed, according to an illustrative embodiment.
Figure 12:
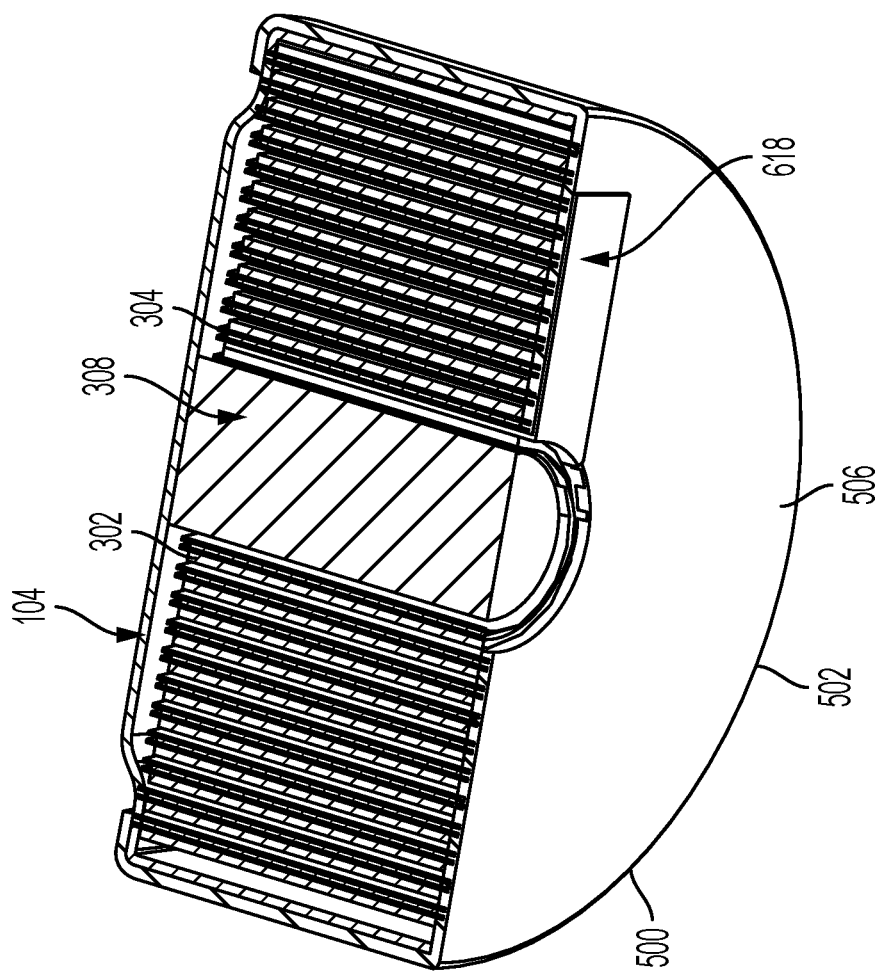
FIG. 12 is a reproduction of FIG. 11 at a cross section through an axis of the battery, according to an illustrative embodiment.

As shown in FIGS. 11-14, each battery 14, 18 includes an active core 300, 600, which is electrically insulated from the lower cup 102 (not shown) by the insulating layer 500. The insulating layer 500 also serves to electrically insulate the lower cup 102 from the upper cup 104. In the embodiment of FIGS. 11-12, the active core 300 is the same as the active core 300 utilized in the embodiment of FIG. 1. In other embodiments, the active core is of a different construction. In other illustrative embodiments, the tab 618 may be configured to electrically couple the first electrode sheet 302 to the upper cup 104 instead of the mandrel 308, while the mandrel 308 is configured to electrically couple the second electrode sheet 304 to the lower cup 102. In yet other embodiments, such as in the embodiment of FIGS. 13-14, an active core 600 of a battery 18 includes a first tab 618 and a second tab 632, where the second tab 632 takes the place of the mandrel. The second tab 632 is a thin elongated strip of conductive material (e.g., nickel, copper, etc.) that is configured to electrically couple the first electrode sheet 302 to the upper cup 104. The second tab 632 is formed (e.g., bent, stamped or otherwise formed) such that a first end of the second tab 632 contacts the first electrode sheet 302 at a location proximate to the insulating layer 500. The second tab 632 extends through a gap 124 between the active core 600 and the upper cup 104 and is folded over proximate to where the second tab 632 meets with the upper cup 104. The second tab 632 extends a distance laterally (i.e., in a direction that is oriented away from a central axis 16 of the battery 18) along an inner surface of the upper cup 104 toward a second end of the second tab 632, which is electrically coupled (e.g., welded, brazed, etc.) to the upper cup 104.

Figure 13:
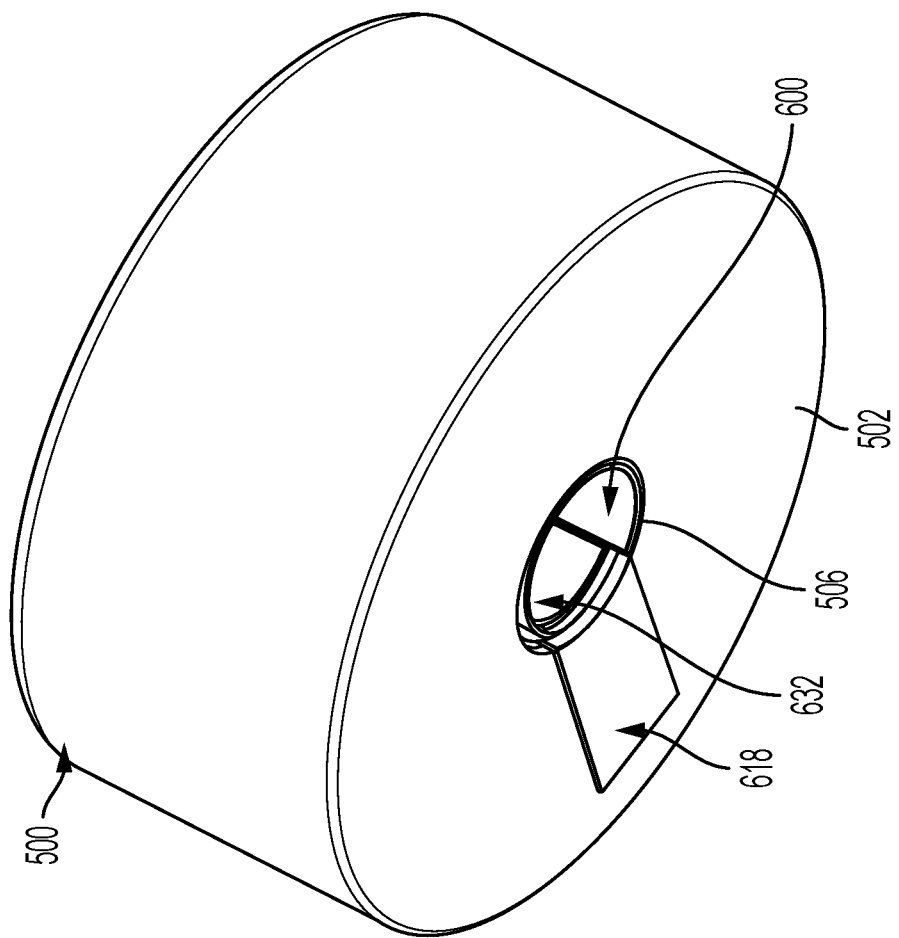
FIG. 13 is a bottom perspective view of a hearing aid battery with an outer casing removed, according to an illustrative embodiment.
Figure 14:
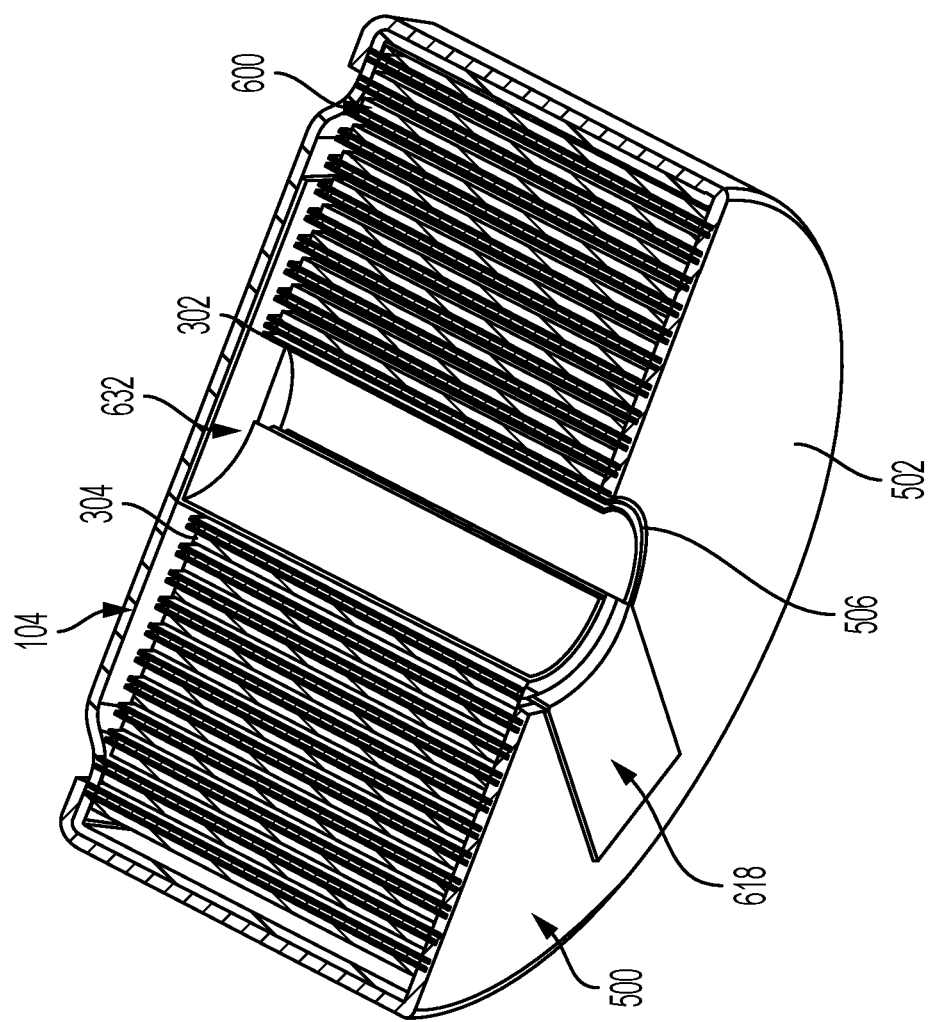
FIG. 14 is a reproduction of FIG. 13 at a cross section through an axis of the battery, according to an illustrative embodiment.

Like the embodiment of FIGS. 1-8, the battery 14 of FIGS. 11-12 and the battery 18 of FIGS. 13-14 both include a tab, show as first tab 618, that is configured to electrically couple the second electrode sheet 304 to the lower cup 102. As shown in FIGS. 11-14, the first tab 618 takes the form of a thin elongated strip of conductive material (e.g., titanium, etc.). As shown in FIGS. 12 and 14, a first end of the first tab 618 is attached (e.g., electrically coupled) to the second electrode sheet 304. The first tab 618 extends through the circular slot 506 at a location proximate to a perimeter of the slot 506. The first tab 618 is folded over at the perimeter of the slot 506 and extends a distance along the bottom wall 502 of the insulating layer 500. As with the embodiment of FIG. 1, the insulating layer 500 used in the batteries 14, 18 of FIGS. 11-14 electrically insulates the first tab 618 from the active core 300, 600.

As shown in FIGS. 1-8 and FIGS. 11-14, the anode (e.g., the first electrode sheet 302) is electrically coupled (e.g., welded, etc.) to the mandrel 308, 608, which is electrically coupled to the upper cup 104. The cathode (e.g., the second electrode sheet 304) is electrically coupled to the first tab 318, 618, which is electrically coupled to the lower cup 102. In alternative embodiments, this configuration may be modified. For example, the cathode (e.g., the second electrode sheet 302) may be electrically coupled to the mandrel 308, 608, which may be electrically connected to the lower cup 102 via the first tab 318, 618. The anode (e.g., the first electrode sheet 302) may be electrically coupled to a separate collecting tab, which may be electrically coupled to the upper cup 104. Note that in this alternative embodiment, the relative lengths of each of the first electrode sheet 302 and the second electrode sheet 304 (e.g., the lengths in a substantially longitudinal direction 314, the lengths in a winding direction, etc.) may need to be reversed relative to other embodiments described herein. In addition, it may be that electrical coupling between the mandrel 308 and the upper cup 104 (or alternatively, the mandrel 308 and the lower cup 102) may be achieved through pressure contacts between the mandrel 308 and the upper cup 104 (or alternatively, between the mandrel 308 and the lower cup 102), or pressure contacts between the first tab 318 and the upper cup 104 (or alternatively, pressure contacts between the first tab 318 and the lower cup 102). In an embodiments including a tension rod mandrel (as shown in FIGS. 15-17) instead of a solid core mandrel, the spring or viscoelastic property of the mandrel ensures adequate contact pressure to achieve appropriate electrical coupling despite any small dimensional changes.

As used herein, the terms "about" and "approximately" will be understood by persons of ordinary skill in the art and will vary to some extent depending upon the context in which they is used. If there are uses of these terms which are not clear to persons of ordinary skill in the art, given the context in which it is used, "about" and "approximately" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

Other embodiments are set forth in the following claims.

What is claimed is:

1. A button cell battery comprising:
   a casing comprising:
      an inner casing;
      an outer casing that at least partially surrounds the inner casing, wherein together the outer casing and the inner casing define an internal volume;
   a core disposed in the internal volume, the core comprising:
      a first electrode;
      a second electrode;
      at least one separator layer disposed between the first electrode and the second electrode; and
      a first tab having a first end and a second end, wherein the first end is attached to one of the first electrode and the second electrode and the second end is attached to one of the outer casing and the inner casing; and
   a grommet disposed at least partially between the inner casing and the outer casing, the grommet comprising an opening disposed in a bottom wall of the grommet where the bottom wall of the grommet is solid other than the opening, wherein the opening is a rectangular slot positioned a distance from a central axis of the grommet, wherein the core is separated from one of the outer casing and the inner casing by the bottom wall of the grommet, and wherein the first tab extends through the opening;
   wherein the grommet further includes a sidewall attached to and extending upwards relative to an outer periphery of the bottom wall of the grommet;
   wherein the grommet bottom wall is disposed between a lower surface of the outer casing and a lower surface of the inner casing, and the grommet sidewall is disposed between an outer surface of a sidewall of the inner casing and an inner surface of a sidewall of the outer casing; and
   wherein the grommet sidewall is arranged to seal the inner casing and the outer casing, the grommet sidewall is arranged to insulate the inner casing from the outer casing, and the grommet bottom wall is arranged to insulate the core from the outer casing.

2. The button cell battery of claim 1, wherein the first tab is welded to one of the outer casing and the inner casing.

3. The button cell battery of claim 1, wherein the grommet is configured to seal a gap between the inner casing and the outer casing.

4. The button cell battery of claim 1, the core further comprising a mandrel, wherein the first electrode, the second electrode, a first separator layer, and a second separator layer are arranged in a stack, wherein the first separator layer and the second separator layer are disposed on opposite sides of the first electrode or second electrode, wherein the stack is wound in a spiral configuration around the mandrel.

5. The button cell battery of claim 4, wherein a height of the mandrel parallel to an axis of the mandrel is greater than a height of the stack parallel to the axis of the mandrel.

6. The button cell battery of claim 4, wherein a height of each of the first separator layer and the second separator layer parallel to an axis of the mandrel is greater than a height of both the first electrode and the second electrode parallel to the axis of the mandrel.

7. The button cell battery of claim 4, wherein the first electrode is welded to the mandrel before winding the stack about the mandrel.

8. The button cell battery of claim 7, wherein the first electrode is an anode of the button cell battery and the second electrode is a cathode of the button cell battery.

9. The button cell battery of claim 7, wherein the first electrode is a cathode of the button cell battery and the second electrode is an anode of the button cell battery.

10. A method of assembly for a button cell battery, the button cell battery comprising an active core, an inner casing defining an upper cavity, an outer casing defining a lower cavity, and a grommet that is configured to separate the active core from the outer casing, the grommet comprising an opening disposed in a bottom wall of the grommet where the bottom wall of the grommet is solid other than the opening, and a sidewall attached to an extending upwards relative to an outer periphery of the bottom wall of the grommet, the method comprising:
   inserting the active core into one of the upper cavity and the lower cavity, the active core comprising a stack, the stack comprising a first electrode and a second electrode;
   inserting a tab through the opening in the grommet, wherein the opening is a rectangular slot positioned a distance from a central axis of the grommet, and wherein a first end of the tab is attached to one of the first electrode and the second electrode;

fitting the inner casing to the outer casing, wherein the grommet separates the inner casing from the outer casing;

sealing the inner casing and the outer casing with the grommet sidewall;

insulating the inner casing from the outer casing with the grommet sidewall; and insulating the core from the outer casing with the grommet bottom wall.

11. The method of claim 10, further comprising folding an upper edge of the outer casing over the grommet and the inner casing.

12. The method of claim 10, the stack further comprising a first separator layer, and a second separator layer, wherein the first separator layer and the second separator layer are disposed on opposite sides of the first electrode, the method further comprising:

welding the first electrode to a mandrel; and winding the stack in a spiral configuration around the mandrel to form the active core.

13. The method of claim 12, further comprising welding the mandrel to the inner casing.

14. The method of claim 12, further comprising welding the mandrel to the outer casing.

15. A button cell battery comprising:

a casing comprising:

an inner casing; and an outer casing that at least partially surrounds the inner casing, wherein together the inner casing and the outer casing define an internal volume;

a core disposed in the internal volume;

a first tab configured to electrically couple a portion of the core to one of the inner casing and the outer casing; and a grommet disposed within the internal volume between the core and at least one of the outer casing and the inner casing;

wherein the grommet comprises an opening disposed in a bottom wall of the grommet where the bottom wall of the grommet is solid other than the opening, wherein the opening is a rectangular slot positioned a distance from a central axis of the grommet, and wherein the first tab extends through the opening;

wherein the grommet includes a sidewall attached to and extending upwards relative to an outer periphery of the bottom wall of the grommet, and wherein:

the grommet sidewall is arranged to seal the inner casing and the outer casing, the grommet sidewall is configured to electrically insulate the outer casing from the inner casing, the grommet bottom wall is configured to electrically insulate the core from one of the outer casing and the inner casing, and the grommet is configured to electrically insulate a portion of the first tab from the core.

* * * * *